（12）United States Patent
Schiller et al.

(10) Patent No.: US 9,100,703 B2
(45) Date of Patent: Aug. 4, 2015

(54) IDENTIFYING A SIGNAL ROUTE FOR DELIVERY OF VIDEO-ON-DEMAND TO A SUBSCRIBER TERMINAL

(71) Applicant: Broadband Royalty Corporation, Wilmington, DE (US)

(72) Inventors: Jay B Schiller, Denver, CO (US); Andrew J. B Poole, Louisville, CO (US)

(73) Assignee: ARRIS Solutions, Inc., Suwanee, GA (US)

( * ) Notice: Subject to any disclaimer, the term of this patent is extended or adjusted under 35 U.S.C. 154(b) by 26 days.

(21) Appl. No.: 13/843,104

(22) Filed: Mar. 15, 2013

(65) Prior Publication Data

US 2013/0227623 A1 Aug. 29, 2013

Related U.S. Application Data

(63) Continuation of application No. 09/759,935, filed on Jan. 12, 2001, now Pat. No. 8,418,214.

(60) Provisional application No. 60/176,393, filed on Jan. 13, 2000.

(51) Int. Cl.
| | |
|---|---|
| H04N 7/173 | (2011.01) |
| H04L 12/28 | (2006.01) |
| H04N 21/472 | (2011.01) |
| H04N 21/235 | (2011.01) |
| H04N 21/2383 | (2011.01) |
| H04N 21/2385 | (2011.01) |
| H04N 21/258 | (2011.01) |
| H04N 21/435 | (2011.01) |
| H04N 21/64 | (2011.01) |
| H04N 21/6405 | (2011.01) |
| H04N 7/16 | (2011.01) |
| H04Q 11/04 | (2006.01) |

(52) U.S. Cl.
CPC ...... *H04N 21/47202* (2013.01); *H04N 7/17318* (2013.01); *H04N 7/17336* (2013.01); *H04N 21/235* (2013.01); *H04N 21/2383* (2013.01); *H04N 21/2385* (2013.01); *H04N 21/25816* (2013.01); *H04N 21/435* (2013.01); *H04N 21/64* (2013.01); *H04N 21/6405* (2013.01)

(58) Field of Classification Search
CPC .................... H04N 7/17336; H04N 21/47202; H04N 21/64; H04N 21/6405
USPC ................................ 725/93–98, 118, 120, 90
See application file for complete search history.

(56) References Cited

U.S. PATENT DOCUMENTS

| 6,697,376 | B1 * | 2/2004 | Son et al. ...................... 370/465 |
| 7,246,366 | B1 * | 7/2007 | Addington et al. ............. 725/93 |
| 8,418,214 | B2 * | 4/2013 | Schiller et al. .................. 725/97 |
| 2013/0227623 | A1 * | 8/2013 | Schiller et al. .................. 725/97 |

\* cited by examiner

*Primary Examiner* — Pankaj Kumar
*Assistant Examiner* — Reuben M Brown
(74) *Attorney, Agent, or Firm* — Troy A. Van Aacken

(57) ABSTRACT

A set top box includes an interface to a video on demand system, the interface adapted to receive communications from one or more modulators of a modulator group of the video on demand system. The set top further includes a decoder configured to extract a modulator group identifier periodically inserted into communications directed the set top box from the one or more modulators, the modulator group identifier unique to a physical transmission path from a headend of the video on demand system to the one or more modulators. The set top includes a video-on-demand request interface to the video on demand system, the video on demand request interface configured to output a request for video on demand data including the modulator group identifier.

7 Claims, 3 Drawing Sheets

IDENTIFYING A SIGNAL ROUTE FOR DELIVERY OF VIDEO-ON-DEMAND TO A SUBSCRIBER TERMINAL

RELATED APPLICATIONS

This application claims priority under 35 U.S.C. 120 as a Continuation of application no. U.S. Ser. No. 09/759,935, filed on Jan. 12, 2001, which claims priority under 35 U.S.C. 119 to application No. U.S. 60/176,393, filed on Jan. 13, 2000.

APPENDIX

The attached Appendix A (pages A1-A6) contains information about the ISO/IEC JTC 1/SC 29 standard entitled "Coding of Audio, Picture, Multimedia and Hypermedia Information".

BACKGROUND OF THE INVENTION

The invention relates to the field of delivery of video-on-demand (VOD). More particularly, the invention relates to identification of an audio/video signal path from a video server to a subscriber terminal.

Typically, cable TV networks, such as CNN and video programming from a VOD server, transmit audio/video programming signals from a cable hub or a headend facility to one or more cable subscribers via a hybrid fiber optic and coaxial cable (HFC) television network. In accordance with National Television Standards Committee (NTSC), the video signals are carried in 6 MHz channel slots that are kept separate by using frequency division multiplexing (FDM). Each separate baseband video signal is assigned a unique radio-frequency (RF) and up-converted to its assigned RF frequency so that multiple signals may simultaneously share the HFC network in accordance with FDM.

Programming signals from the hub or headend are typically transmitted as either analog signals or as digital transport streams. For example, each analog audio/video programming signal may occupy a 6 MHz channel. An example of a digital protocol by which the digital transport streams may be communicated is Moving Pictures Experts Group (MPEG or MPEG-2) which is described in more detail in the attached Appendix A. MPEG-2 is a standardized protocol by which moving pictures and accompanying sound tracks may be communicated digitally. This standard defines data packets, each including a packet header and data field. For digital networks or video server programs, multiple digital signals or programs may share a 6 MHz channel. The digital signals are typically transmitted using quadrature amplitude modulation (QAM). QAM-64 and QAM-256 are typical QAM modulations schemes. Typically, a combination of analog and QAM signals may be transmitted to cable subscribers via the HFC network using FDM. A QAM-256 modulator has a throughput of approximately 38 Mbps, which is equivalent to ten simultaneous audio/video programs, each at 3.8 Mbps VOD.

Multiple HFC networks or paths from each hub carry cable programming to different areas, such as different geographic neighborhoods. For non-VOD cable networks, an up-converter is typically used to broadcast programming signals over all of the HFC networks in a corresponding 6 MHz slot or RF channel frequency. Additional up-converters may broadcast additional signals to all of the HFC networks in other RF channels. Thus, each neighborhood receives all of the same programs over the corresponding RF channel frequencies.

For VOD, however, such a scheme of broadcasting VOD programming to every area or neighborhood may be inefficient. For example, assume that a hub feeds three HFC networks, where each HFC network provides data to a different neighborhood. Assume also, for example, that to meet demand for VOD, each neighborhood requires a maximum of twenty simultaneous programs. Assuming that one QAM channel is required for every ten programs, twenty programs is equivalent to 2 QAM channels or 12 MHz. For all three neighborhoods, the video server in the hub would need to support 60 simultaneous video programs so that 6 QAM channels would be required. If all 6 QAM channels are up-converted and broadcast on all three HFC networks, 36 MHz of bandwidth would be required on each HFC network. However, because each neighborhood may be expected to require only 12 MHz of bandwidth, this technique has a disadvantage of resulting in unnecessary bandwidth being provided to each neighborhood.

Therefore, what is needed is a technique and system for delivery of VOD data which does not suffer from the aforementioned drawback of typical systems. It is to this end that the present invention is directed.

SUMMARY OF THE INVENTION

The invention is a method and apparatus for identifying an appropriate video signal path for delivery of video-on-demand (VOD) to a subscriber in a VOD system. In the VOD system, each signal path from a VOD server services only the subscribers within a designated area or neighborhood. The signal path may be a portion of a hybrid fiber optic and cable (HFC) network. The other unused signal paths in the HFC network may then service subscribers in other areas. Because each path need not service every area, the total bandwidth provided by the VOD server need not be provided to every area so that bandwidth is not wasted. Rather, the bandwidth provided to each area can be commensurate with the needs of that area.

In accordance with the invention, a unique identification may assigned to each area. The video server may periodically transmit the appropriate identification to the subscriber terminals of each area. The subscriber terminals may be pre-configured to receive the unique identification. When a subscriber requests VOD programming, the identification received by the subscriber's terminal from the VOD server is returned to the server along with the request. From the identification, the VOD server may determine the area in which the requesting subscriber is located. The VOD server may then transmit the requested programming to the area in which the subscriber is located for reception by the subscriber. This prevents the VOD server from having to unnecessarily send the requested programming to all the other areas.

In accordance with one aspect of the invention, a VOD server identifies an appropriate video signal path for delivery of VOD to a subscriber in a VOD system. The subscribers may be arranged according to a plurality of groups, each group having one or more corresponding signal paths from the server to the subscribers of the group. Each group receives a corresponding identification from the server. A subscriber request for programming from the server includes the identification associated with the group to which the subscriber belongs. In response to the request, the server provides the requested programming to the subscriber via the signal path which corresponds to the group.

Thus, in accordance with the invention, a video on demand headend for distributing video on demand to one or more groups of subscribers is provided wherein each group of subscribers is serviced by one or more modulators connected to the headend wherein each modulator modulates the video on demand data at a different frequency. The headend comprises a video server, an application server connected to the video server, means for periodically generating a unique identification packet for each group of subscribers, means for receiving a request for video on demand data from a subscriber, the request comprising the unique identification packet for the group of subscribers to which the subscriber belongs, the request for particular video on demand data and a unique subscriber identifier, and means for selecting a modulator from the one or more modulators servicing the group of subscribers to which the subscriber belongs based on the unique identification packet.

In accordance with another aspect of the invention, a video on demand system for distributing video on demand is provided, comprising a headend having a video server and an application server and one or more modulators connected to the headend, one or more groups of subscribers each being serviced by one or more modulators, the one or more modulators servicing a particular group of subscribers modulating the video on demand data at different frequencies so that the modulated signals to the particular group of subscribers share the same physical media. The headend further comprises means for assigning a unique plant identifier for each group of subscribers so that video on demand data destined for a particular group of subscribers is modulated using the one or more modulators that service that particular group of subscribers.

In accordance with another aspect of the invention, a video on demand delivery method for distributing video on demand to one or more groups of subscribers wherein each group of subscribers is serviced by one or more modulators connected to a headend, each group of subscribers being assigned a unique plant identification is provided. The method comprises receiving the unique plant identification by a particular subscriber, generating a video on demand data request by the particular subscriber to the headend, the video on demand data request including the unique plant identification, the data request and a unique subscriber identification, and selecting, at the headend, a modulator from the one or more modulators assigned to the group of subscribers that the particular subscriber is part of, based on the unique plant identification.

DETAILED DESCRIPTION OF A PREFERRED EMBODIMENT

The invention is particularly applicable to a QAM-based VOD system and it is in this context that the invention will be described. It will be appreciated, however, that the system and method in accordance with the invention has greater utility.

Figure 1A:
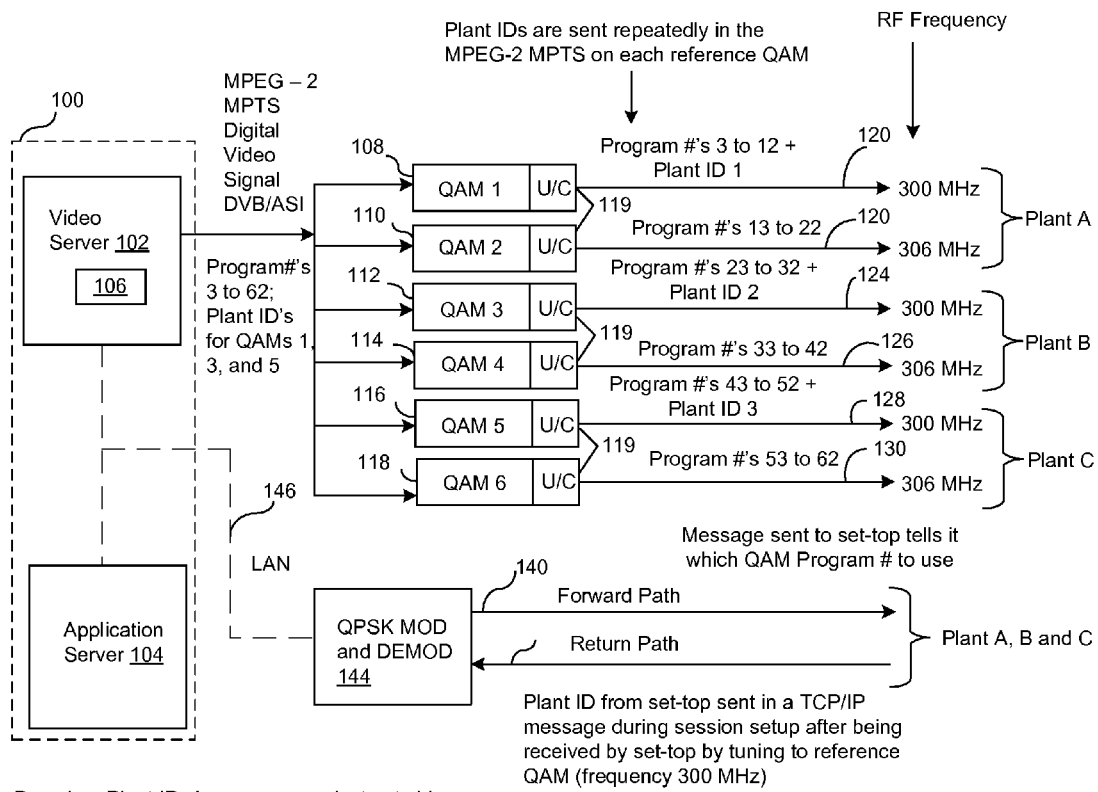
FIG. 1A illustrates a video on demand (VOD) system in accordance with the invention.
Figure 1B:
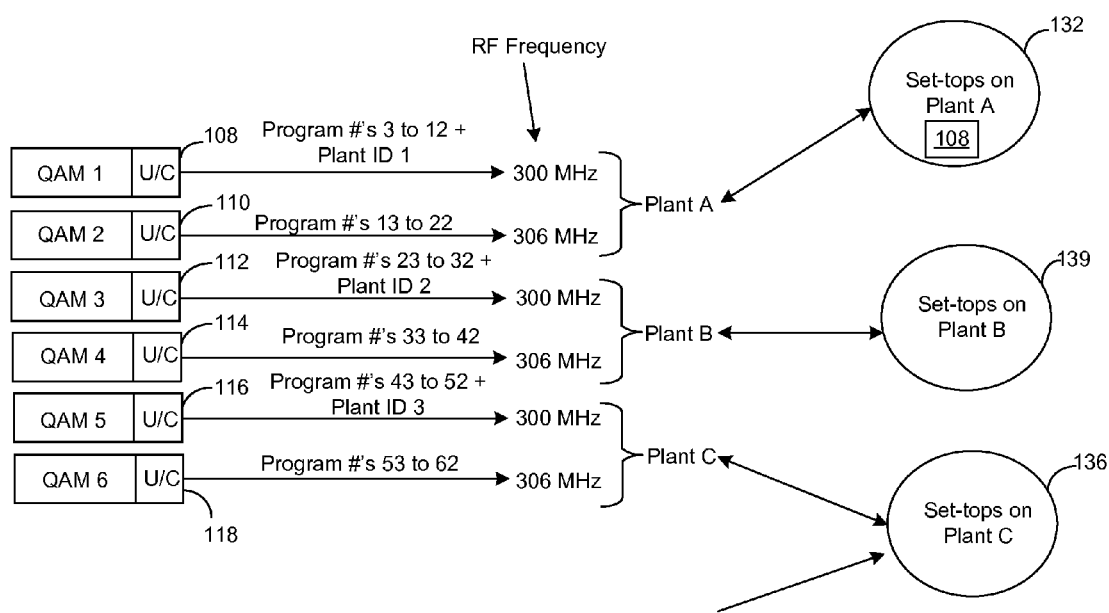
FIG. 1B illustrates the video path assignment in accordance with the invention.

FIGS. 1A-B illustrate a block schematic diagram illustrating an example of a preferred embodiment of a video-on-demand (VOD) system in accordance with the present invention. A hub or headend 100 may include a video server 102 and an application server 104 which are connected together. In a preferred embodiment, the video server 102 may be, for example, an nCube Corporation MediaCube and may include one or more pieces of software or software modules being executed by the one or more processors (not shown) of the video server such as an operating system (e.g., from nCube Corporation), a real-time streaming protocol (RTSP) application program (e.g., from nCube Corporation) and an video server application program (e.g., from Oracle Corporation). The video server 102 is well known and, thus, elements thereof may be altered or may be substituted by others without departing from the invention. The video server 102 may also include a data formatter 106, which formats digital audio/video data into a form suitable for transmission. In a preferred embodiment, the data formatter 106 may include, for example, a well known MPEG multiplexer. In a preferred embodiment, the application server 104 may include a Sun Microsystems Ultra-5 server running a Solaris operating system (also available from Sun Microsystems), a database application program (e.g., an Oracle-8 available from Oracle Corporation) and other application programs (e.g., in Java language). The application server 104 may be conventional and, thus, elements thereof may be altered or may be substituted by others.

Audio/video data, such as motion picture programming and the like, may be generated by the video server 102 from prestored video programs or movies stored in the video server's attached storage devices or may be stored remotely from the video server and communicated to the video server. The audio/video data may be formatted for transmission by the data formatter 106. For example, the audio/video data may be formatted in accordance with MPEG-2 multiple program transport stream (MPTS) digital video signal standard for digital video broadcast, asynchronous serial interface (DVB/ASI). In a preferred embodiment, the formatted DVB/ASI video data may include, for example, up to sixty-two simultaneously broadcast programs ("programs"). Selected programs may then be provided to each of a plurality of well known quadrature amplitude modulation (QAM) modulators 108-118 (QAM 1-QAM 6 in the example shown). For example, programs 1-2 may be reserved; programs 3-12 may be provided to modulator 108; programs 13-22 may be provided to modulator 110; programs 23-32 may be provided to modulator 112; programs 33-42 may be provided to modulator 114; programs 43-52 may be provided to modulator 116; and programs 53-62 may be provided to modulator 118. Each modulator may include an up converter (U/C) 119 as is well known. In a preferred embodiment, the modulators 108, 112, 116 may up-convert the video signals to a 300 MHz frequency for transmission while the modulators 110, 114, 118 may up-convert the video signals to a 306 MHz frequency for transmission. It will be apparent that other transmission frequencies may be selected. In addition, the modulators 108-118 may be incorporated into the hub 100, for example, as part of the video server 102.

Each group of programs may then be routed to one or more groups of subscribers 132-136 (See FIG. 1B) via one or more corresponding network links 120-130, such as in a hybrid fiber optic and coaxial cable (HFC) network. Because network links 120 and 122 may be frequency-division multiplexed (FDM), the links 120 and 122 may share the same physical transmission media. Similarly, other links 124, 126 and 128,130 may share the same physical media. Each designated grouping of RF up-converted QAM modulators from which a given group of subscribers may receive a video signal may be referred to as a plant (e.g., Plant A, Plant B and Plant C is the example shown in FIG. 1A). Thus, modulators 108 and 110 may correspond to Plant A which services subscriber group 132; modulators 112 and 114 may correspond to Plant B which services subscriber group 134; and modulators 116 and 118 may correspond to Plant C which service subscriber group 136. Each plant may represent one of the physical HFC networks extending from a headend or hub through an optical node to a neighborhood.

Each group of subscribers 132-136 may be located in a different area or neighborhood. Each subscriber terminal, e.g., terminal 138, in a plant or subscriber group may include well known audio/video reception and display apparatus (not shown), such as, for example, a set-top box and a television set and may be located in subscriber homes or places of business.

In addition to transmitting audio/video data requested by subscribers, each plant may also transmit an identification designator to the subscribers serviced by the plant. For this purpose, each plant may be assigned a unique plant identification code name or number. In the example shown, Plant A may be assigned a first identification (Plant ID 1) which is communicated to subscribers of group 132; Plant B may be assigned a second identification (Plant ID 2) which is communicated to subscribers of group 134; and Plant C may be assigned a third identification (Plant ID 3) which is communicated to subscribers of group 136. In the preferred embodiment, the identifications are packetized by the data formatter or MPEG-2 multiplexer 106 into packets (referred to herein as "identification packets") in accordance with the MPEG-2 standard (described in more detail in the attached Appendix A) in which header information identifies the packet's program identification (PID) which correlates its payload type as "user data" in the program map table (PMT) packet. The payload in this case includes the appropriate identification code or name. An appropriate identification packet is preferably transmitted recurrently (e.g., every 1 second) to each of the subscriber groups 132-136 via one of the modulators associated with each plant. For example, the identification packets may be transmitted by the 300 MHz modulators 108, 112 and 114. In which case, the subscribers of each group may monitor the received 300 MHz signal for the identification packets.

The subscriber terminals of the groups 132-136 may be pre-configured to monitor the received signals for the plant identification packets by an appropriate application program which is pre-loaded into the subscriber terminals. For example, the application program may be loaded at the time of manufacture or installation of each subscriber terminal. Alternately, the application program may be provided to the subscriber terminals by the application server 104, or by another application server, over a LAN 146 and a well known quadrature phase shift key (QPSK) modem 144 via forward path 140 or via a broadcast file system (BFS), such as Scientific Atlanta Inc.'s network controller BFS.

Thus, the plant identification may be transmitted as an MPEG stream by at least one of the modulators 108-118 for each plant. For example, at least one of the modulators 108-118 on each plant may carry the unique identification as an MPEG program in its multiplex. The modulators for each plant which contain the identification program may all have the same RF up-converted frequency assignment (e.g., 300 MHz). These modulators are referred to herein as the reference modulators (e.g., modulators 108, 112, 116). The unique plant identification for each plant may be defined while configuring the VOD system. The identifications may be inserted into an MPEG transport packet by a wrapper program and stored by the video server 102 or accessible to it. The plant identification packets may be repeatedly transmitted along with other MPEG programming (typically video and associated audio) or alone via the RF channel associated with the reference modulator. Now, a method for identifying a VOD signal route in accordance with the invention will be described in more detail.

Figure 2:
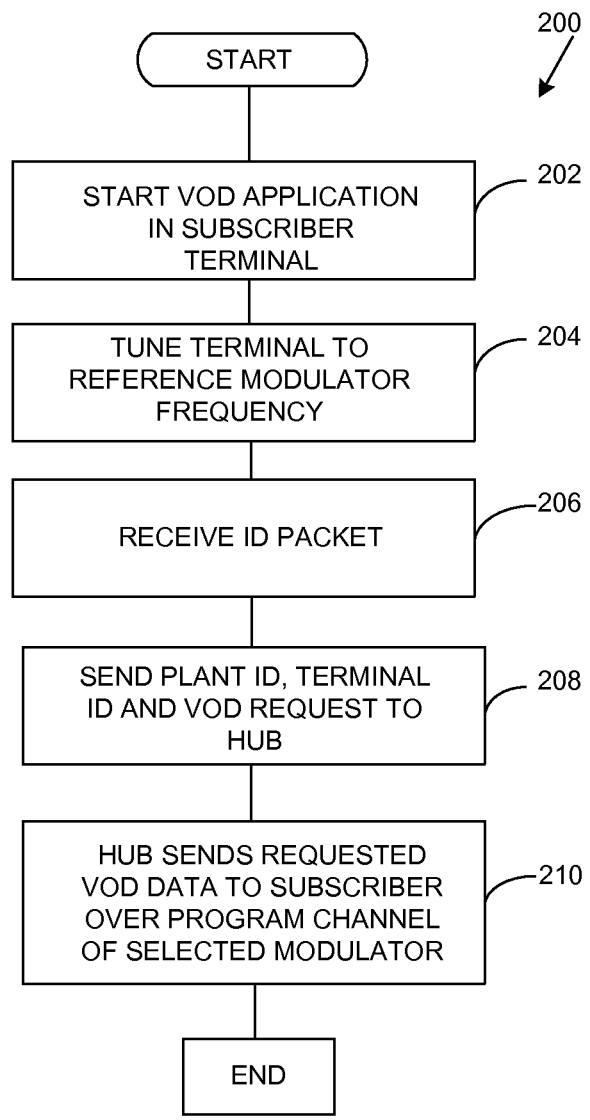
FIG. 2 illustrates a method for identifying a VOD signal route in accordance with the invention.

FIG. 2 illustrates a method 200 for identifying a signal route for a particular piece of VOD data, such as a movie, to a particular subscriber that belongs to a particular Plant. In more detail, when a subscriber, such as a subscriber at terminal 138, desires to order a movie, the subscriber may turn to the movie channel on their set-top box. Then, a VOD application may be launched in their set-top box in step 202. This application program may be resident in the set-top box or may be downloaded from the application server 104, or another application server, upon the subscriber accessing the subscriber channel. The application program may cause the terminal 138 to tune to the RF channel defined as the reference modulator (e.g., 300 MHz) in step 204. The terminal may then receive an identifier packet in step 206 and then read the plant identification by extracting the MPEG user data within a pre-assigned MPEG program number in the MPEG multiplex on that reference modulator (e.g., for the terminal 138, the reference modulator is the modulator 108).

The set-top box of the subscriber terminal (e.g., the terminal 138) may then communicate the plant identification, along with the movie request, to the application server 104 of the hub 100 in response to the subscriber requesting a movie or other programming in step 208. An identification unique to the subscriber terminal may also be sent to the hub 100. For example, the subscriber terminal may communicate with the hub via a forward path 140 and a return path 142, the QPSK) modem 144 and the local area network (LAN) 146. The forward and return paths 140, 142 may be part of an HFC network. It will be apparent, however, that communication between the subscriber terminals and the hub 100 may be provided by another means, such as a LAN, a direct telephone connection or the world-wide web (Internet).

Upon reception of the plant identification and subscriber terminal identification, the application server 104 may determine which modulators, video server 102 output connector and program numbers serve that particular subscriber terminal. The hub 100, therefore, can determine which of modulators 108-118 are capable of reaching the requesting subscriber. The requested video programming may then be transmitted by a modulator within the appropriate plant. For example, terminal 138 is serviced by Plant A. Therefore, modulators 108 and 110 are both capable of reaching the subscriber terminal 138. However, as shown in FIGS. 1A-B, the modulators 112-118 are not capable of reaching the subscriber terminal 138.

An available program may then be selected from the corresponding program numbers (e.g., for plant A, one of programs 3-22 may be selected) for transmitting the requested programming to the subscriber. The selected QAM modulator RF frequency and program number may then be communicated to the requesting subscriber terminal, such as the terminal 138, via forward path 140. In response, the set-top box of the subscriber terminal, e.g., terminal 138, may then configure itself to receive audio/video data from that QAM modulator. The video server 102 may then provide the requested programming to the subscriber via the selected channel in step 210. Once the program is complete, the transmission may be terminated. During transmission of programming to a subscriber terminal, other terminals in the groups 132-136 may interact with the hub 100 in this manner to receive requested programming. Thus, by assigning a subset of the modulators 108-118 to each of the subscriber groups 132-136, available bandwidth of the system is utilized efficiently. The excess bandwidth may be used for other programming.

While the foregoing has been with reference to particular embodiments of the invention, it will be appreciated by those skilled in the art that changes in these embodiments may be made without departing from the principles and spirit of the invention, the scope of which is defined by the appended claims. For example, the number of modulators and programs for each plant may be altered. In addition, the number of plants may be altered. Further, the specific protocols and modulation parameters disclosed herein may be altered. The system may also include multiple DVB/ASI channels to multiple sets of QAM modulators, thereby altering the number of modulators shown in FIGS. 1A-B.

The invention claimed is:

1. A set top box comprising:
   a video-on-demand receiver interface to a video-on-demand system, the video-on-demand receiver interface adapted to receive communications from a modulator group of the video-on-demand system;
   a decoder configured to extract a modulator group identifier periodically inserted into communications directed to the set top box from one or more modulators of the modulator group, the modulator group identifier unique to a physical transmission path from a headend of the video on demand system to the one or more modulators of the modulator group; and
   a video-on-demand request interface to the video-on-demand system, the video-on-demand request interface configured to output a request for video-on-demand data including the modulator group identifier.

2. The set top box of claim 1, further comprising:
   the decoder configured to receive, via the video-on-demand receiver interface, a program slot associated with the one or more modulators and assigned to video-on-demand data received in response to the request for video-on-demand data including the modulator group identifier, and an identification of a modulator of the modulator group selected to deliver the video on demand data; and
   the decoder configured to cause the set top box to tune to the program slot associated with the one or more modulators and to the modulator of the modulator group selected to deliver the video on demand data.

3. The set top box of claim 1, further comprising:
   the decoder configured to extract the modulator group identifier from program streams directed the set top box from the one or more modulators.

4. The set top box of claim 3, further comprising:
   the decoder configured to extract the modulator group identifier from MPEG streams directed to the set top box from the one or more modulators of the modulator group.

5. A method of requesting video-on-demand data, the method comprising:
   extracting, from a data stream received from a video distribution network, a periodically recurring modulator group identifier for one or more modulators forming a modulator group that services a plurality of subscriber terminals, the modulator group identifier unique to a physical transmission path from a headend to the one or more modulators;
   transmitting to the video distribution network a request for the video-on-demand data, the request for the video-on-demand data including the modulator group identifier; and
   receiving the video-on-demand data from an assigned modulator of the physical transmission path associated with the modulator group.

6. The method of claim 5, further comprising:
   receiving from the video distribution network a program slot number and an identifier of the assigned modulator of the physical transmission path; and
   tuning to the program slot number and the assigned modulator of the physical transmission path to receive the video-on-demand data.

7. The method of claim 5, further comprising:
   extracting the modulator group identifier from program streams received from the video distribution network.

* * * * *